US010915282B2

(12) United States Patent
Ogaki

(10) Patent No.: US 10,915,282 B2
(45) Date of Patent: Feb. 9, 2021

(54) INFORMATION PROCESSING APPARATUS THAT MANAGES PRINT JOBS BASED ON ORDER INFORMATION, PRINTING SYSTEM, AND PRINT CONTROL METHOD

(71) Applicant: CANON KABUSHIKI KAISHA, Tokyo (JP)

(72) Inventor: Tetsuro Ogaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/666,479

(22) Filed: Oct. 29, 2019

(65) Prior Publication Data

US 2020/0142655 A1  May 7, 2020

(30) Foreign Application Priority Data

Nov. 5, 2018 (JP) .................................. 2018-208368

(51) Int. Cl.
*G06F 3/12* (2006.01)
(52) U.S. Cl.
CPC ............ *G06F 3/1259* (2013.01); *G06F 3/121* (2013.01); *G06F 3/1251* (2013.01); *G06F 3/1267* (2013.01)

(58) Field of Classification Search
None
See application file for complete search history.

(56) References Cited

U.S. PATENT DOCUMENTS

2008/0187384 A1* 8/2008 Yamamoto ............ G06F 3/1234
400/74
2011/0164275 A1* 7/2011 Mikura ................. G06F 3/1203
358/1.15

FOREIGN PATENT DOCUMENTS

JP          3820327 B2    9/2006

* cited by examiner

*Primary Examiner* — Lennin R Rodriguezgonzalez
(74) *Attorney, Agent, or Firm* — Rossi, Kimms & McDowell LLP

(57) ABSTRACT

According to the present invention, an information processing apparatus is provide, which comprises a transmitter that transmits a print job to an image forming apparatus for forming an image on a roll sheet; and a manager that outputs association information associating the print job with printed matter of the roll sheet in accordance with the print job, wherein, when printed matter for one print job is divided into a plurality of pieces, the manager outputs the association information for each piece of the divided printed matter.

8 Claims, 9 Drawing Sheets

FIG. 7

| JOB ID | JOB STATUS | ASSOCIATION MANAGEMENT INFORMATION | PRODUCT INFORMATION |
|---|---|---|---|
| 001 | Printed | Already output | Signboard A |
| 002 | Printed | Before output | Signboard B |
| 003 | Sent to printer | Before output | Signboard C |
| 004 | Before sending | Before output | Poster D |
| 005 | Before sending | Before output | Poster E |

FIG. 8

| JOB ID | JOB STATUS | ASSOCIATION MANAGEMENT INFORMATION | PRODUCT INFORMATION |
|---|---|---|---|
| 001 | Printed | Output done | Signboard A |
| 002 | Printed | Output done | Signboard B |
| 003 | Sent to printer | outputting | Signboard C |
| 004 | Before sending | Before output | Poster D |
| 005 | Before sending | Before output | Poster E | ically. In the case of a cut sheet printer, since the product
INFORMATION PROCESSING APPARATUS THAT MANAGES PRINT JOBS BASED ON ORDER INFORMATION, PRINTING SYSTEM, AND PRINT CONTROL METHOD

BACKGROUND OF THE INVENTION

Field of the Invention

The present invention relates to an information processing apparatus capable of managing jobs printed on rolled paper, for example, a printing system, and a print control method.

Description of the Related Art

Conventionally, in a commercial printing site, a quality check table of a product is output from a higher-level system such as an MIS, and management information for associating the quality check table and a printed product is necessary. For example, management is performed by outputting paper on which order information referred to as a job sheet is written as management information for managing printed products. In the case of a cut sheet printer, since the product and the job sheet can be managed together by outputting the job sheet immediately after the printed product, the product can be understood in association with the order information.

Even in the case of a roll paper printer, if the association between an output roll and a print job can be understood in advance on a higher level application side, management by outputting a job sheet in accordance with an output roll becomes possible. In Japanese Patent No. 3820327, order information is added after a print job is output, and the outputted product is managed by outputting a roll. In the technique of Japanese Patent No. 3820327, since the output roll can be understood on the higher level application side, job information that accords with the output roll is added to the end of the roll to manage the output roll.

However, when a sheet to be outputted is a special sheet such as a film for example, the cut sheet printer may output a job sheet, and thus there are situations that cannot be handled by adding job information to the end of the output roll.

When a printing roll is replaced, an operator of the roll paper printer may perform a cutting operation on the device to output the roll, and replace the printing roll. In this manner, the switching of the roll, which is due to the device and of which the higher level application side cannot be aware, occurs.

The technique of Japanese Patent No. 3820327 has a problem in that it is not possible to handle roll switching attributable to a device such as being out of paper or a cutting instruction on the device side, and the output roll cannot be managed.

SUMMARY OF THE INVENTION

The present invention manages a job sheet outputted on a cut sheet in association with a print job outputted on a roll sheet.

The present invention has the following configurations. In other words, according to one aspect of the present invention, an information processing apparatus is provide, which comprises: a transmitter configured to transmit a print job to an image forming apparatus for forming an image on a roll sheet; and a manager configured to output association information associating the print job with printed matter of the roll sheet in accordance with the print job, wherein, when printed matter for one print job is divided into a plurality of pieces, the manager outputs the association information for each piece of the divided printed matter.

According to another aspect of the present invention a printing system is provided, which comprises: an information processing apparatus; an image forming apparatus; and a second image forming apparatus, wherein the information processing apparatus comprises: a transmitter configured to transmit a print job to the image forming apparatus to form an image on a roll sheet; and a manager configured to output association information associating the print job with printed matter of the roll sheet in accordance with the print job, wherein, when printed matter for one print job is divided into a plurality of pieces, the manager outputs the association information for each piece of the divided printed matter.

In accordance with the present invention, it is possible to manage a job sheet outputted on a cut sheet in association with a print job outputted on a roll sheet.

Further features of the present invention will become apparent from the following description of exemplary embodiments with reference to the attached drawings.

BRIEF DESCRIPTION OF THE DRAWINGS

FIG. 7 is an example of job information stored in the information processing apparatus 101 according to an embodiment.

FIG. 8 is an example of job information, after the reception of a notification, that is stored in the information processing apparatus 101 according to an embodiment.

DESCRIPTION OF THE EMBODIMENTS

Figure 1:
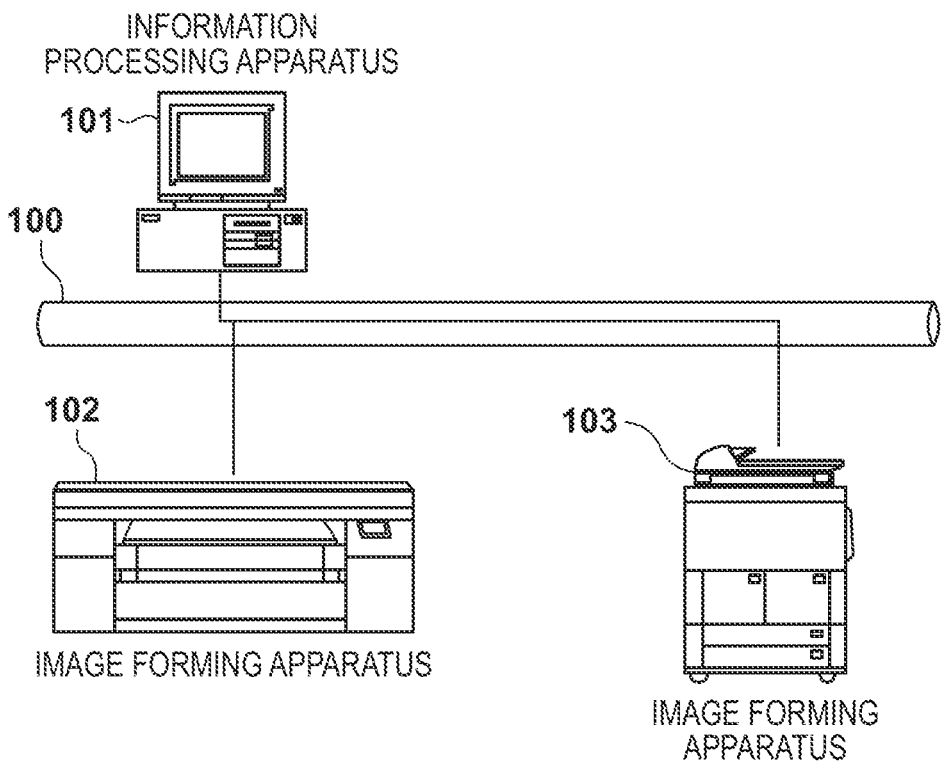
FIG. 1 is a system configuration diagram of a printing system according to an embodiment.

Embodiments of the present invention will be described below in detail with reference to the accompanying drawings. Note, the following embodiments are not intended to limit the invention according to the scope of the claims. Although a plurality of features are described in the embodiments, not all of the plurality of features are essential to the present invention, and the plurality of features may be arbitrarily combined. Furthermore, in the accompanying drawings, the same reference numerals are assigned to the same or similar components, and repetitive description is omitted.

In the present embodiment, description is given by taking a printing system for managing an output roll by outputting a job sheet associated with an output roll as an example means for managing association information. Note that means for managing the output rolls is not limited to the output of a job sheet, and the management method is not limited.

Example of Configuration of Printing System

FIG. 1 is a diagram illustrating an overall configuration of a printing system according to the present embodiment. Note that the environment of the entire printing system in the following description is for facilitating understanding of the description of the present invention, and the present invention is not limited to this environment.

In this figure, an information processing apparatus 101, an image forming apparatus 102, and an image forming apparatus 103 are connected to a network 100. On the information processing apparatus 101, programs such as a job management program for managing the production of printed matter, a Web server, a shipping inspection program and a bar code reading program used at the time of shipment, and the like operate. The information processing apparatus 101 may be a computer, and is connected to the image forming apparatus 102 and the image forming apparatus 103 through a network, and a printer driver program or the like for controlling the image forming apparatus 102 and the image forming apparatus 103 is installed therein. The image forming apparatus 102 analyzes print data including print data sent from the information processing apparatus 101 or the like, and prints an image as a result of the analysis on roll paper. The image forming apparatus 103 analyzes print data including print data sent from the information processing apparatus 101 or the like, converts the print data into a dot image one page at a time, and prints each dot image. The image forming apparatuses 102 and 103 may be referred to as printers.

There may be one or a plurality of each of the information processing apparatus 101, the image forming apparatus 102, and the image forming apparatus 103 in FIG. 1. The network 100 may be the Internet, and configuration may be such that the image forming apparatus 102 and the image forming apparatus 103 are accessed from the information processing apparatus 101 via the Internet, for example.

In the present embodiment, a print job is executed by the image forming apparatus 102, and target printed matter is outputted. Then, the image forming apparatus 103 outputs management printed matter which is called a job sheet and is used to associate and manage printed matter and a print job. The job sheet may be printed with order information including, for example, an order number of the printed matter, an orderer, and information for specifying the printed matter such as a job ID. This information is not particularly specified here, and may be any information as long as it can specify a job in units of orders received. In order to print on a roll sheet, the image forming apparatus 102 cuts the roll paper as needed to output a set of continuous printed matter. In the present embodiment, one job sheet is printed by the image forming apparatus 103 in association with a set of continuous printed matter output by the image forming apparatus 102. For example, even a single print job may be divided into two or more sheets to be printed to due to being out-of-paper or intentional cutting. In such a case, one job sheet is output for each sheet. In this manner, the roll sheet and the job sheet have a one-to-one relationship, and can be logically and physically associated with each other. Therefore, the association between the actual output matter and the print job becomes easy and clear, and management of the printed matter can be facilitated. Details will be described below.

Example of Hardware Configuration of the Information Processing Apparatus 101

Figure 2:
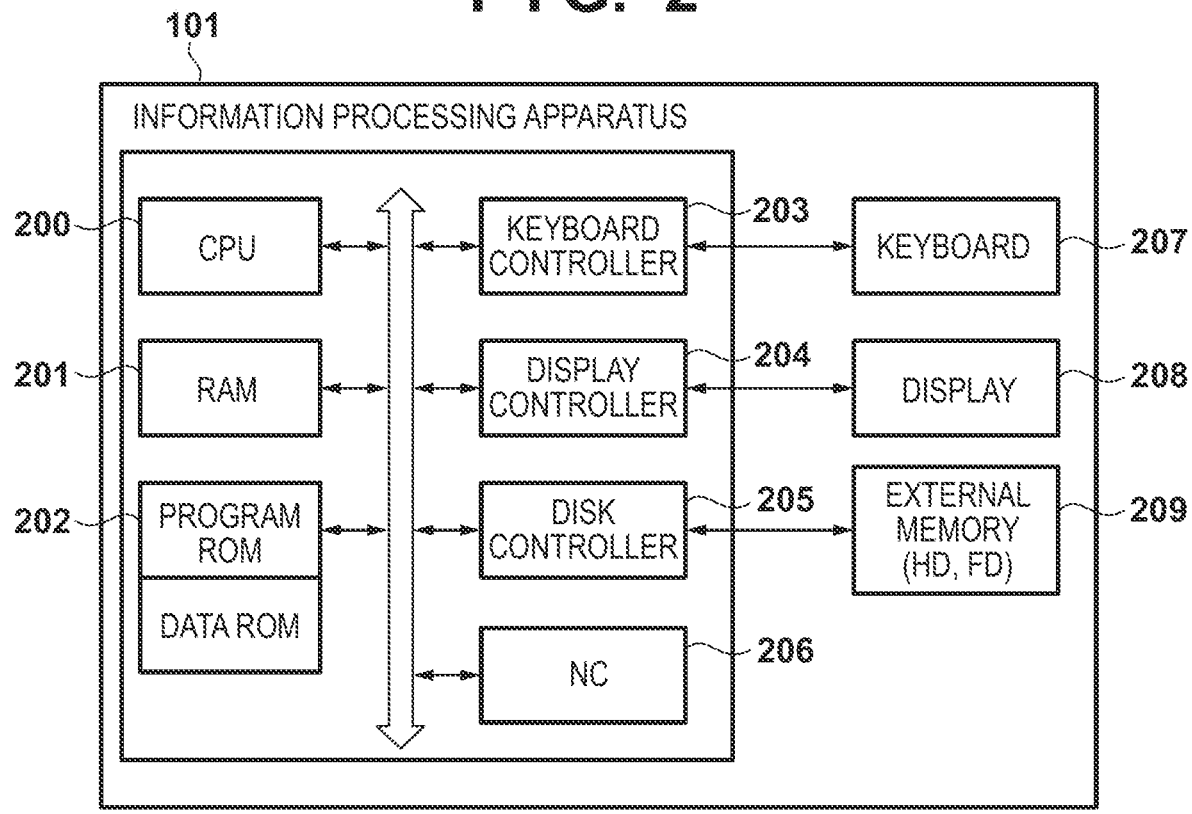
FIG. 2 is a block diagram illustrating a hardware configuration of an information processing apparatus 101 according to an embodiment.

FIG. 2 is a hardware configuration of the information processing apparatus 101 according to the present embodiment. The information processing apparatus 101 can be configured by hardware of a general computer (a PC). In FIG. 2, a CPU 200 executes a program stored in a program ROM in a ROM 202, or a program such as an operating system (OS) or an application program, which is loaded from an external memory 209 such as a hard disk to a RAM 201. That is, the CPU 200 executes a program stored in a readable storage medium to thereby function as each processing unit that executes the processing of each of the flow charts described below. The RAM 201 is a main memory of the CPU 200 and functions as a work area or the like. The keyboard controller 203 controls operation inputs from a keyboard 207, a bar code reader (not illustrated), and a pointing device (for example, a mouse, a touch pad, a touch panel, or a trackball). A display controller 204 controls the display of a display 208. The disk controller 205 controls data access with respect to the external memory 209 which is a hard disk (HD), a flexible disk (FD), or the like and is for storing various data. A network controller (NC) 206 is connected to a network and executes communication control processing with other devices connected to the network.

Example of Software Configuration of the Information Processing Apparatus 101

Figure 3:
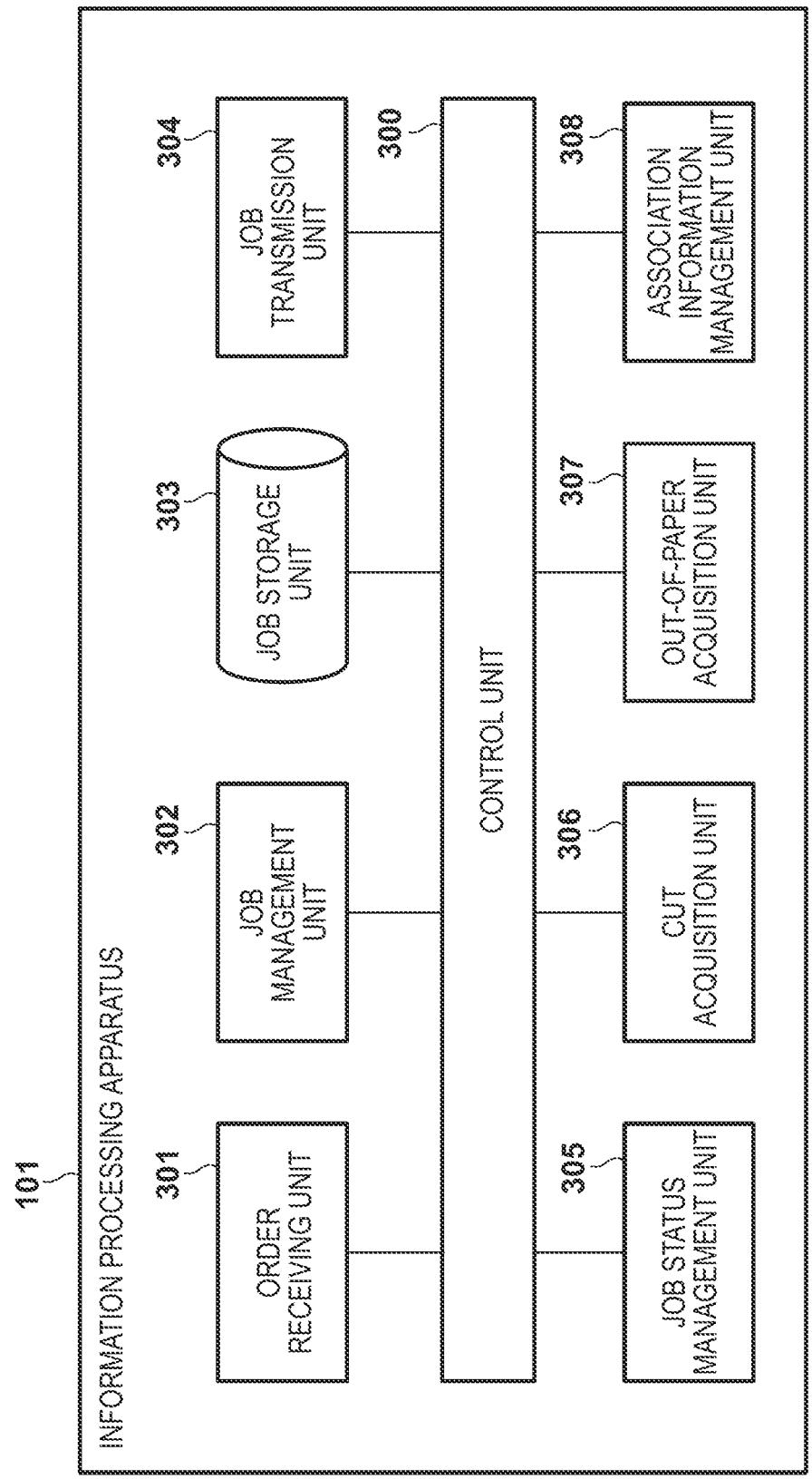
FIG. 3 is a block diagram illustrating a software configuration of the information processing apparatus 101 according to an embodiment.

FIG. 3 is a functional block diagram illustrating functions of the information processing apparatus 101 according to the present embodiment. A control unit 300 performs execution control of functional blocks 301 to 307 of the information processing apparatus 101. An order receiving unit 301 analyzes received information, and passes an analysis result to a job management unit 302 as order information. The job management unit 302 creates a job necessary for the production of a product based on order information received from the order receiving unit 301, and registers and manages created job information in a job storage unit 303. The job information is configured by a management number associated with the order information, a status of a print job, association management information of an output roll, and the like. A job transmission unit 304 transmits a print job stored in the job storage unit 303 to the image forming apparatus 102. A job status management unit 305 receives the print status of the print job transmitted to the image forming apparatus 102 based on a notification (also referred to as job status notification) transmitted from the image forming apparatus 102, and registers the print status as a job status in the job storage unit 303. For example, a job status indicating that a print job has been started in the image forming apparatus 102 or that printing of a print job has been completed is acquired from the image forming apparatus 102 and registered in the job storage unit 303. A cut acquisition unit 306 receives a cut notification transmitted from the image forming apparatus 102 at the timing when the roll paper is switched when a cutting instruction is made in accordance with a cutting operation on the image forming apparatus 102. An out-of-paper acquisition unit 307 receives an out-of-paper notification transmitted from the image forming apparatus 102 at the timing when out-of-paper occurs on the image forming apparatus 102 and the roll paper is switched. An association information management unit 308 acquires roll switching information based on the cut notification or the out-of-paper notification received by the cut acquisition unit 306 or the out-of-paper acquisition unit 307, compares it with the print status of a job stored in the job storage unit 303, and associates the job printed on the output roll with job information to manage it. In the following description, the job status notification, the cut notification, and the out-of-paper notification may be collectively referred to simply as a notification. Since the roll paper is not limited to paper, out-of-paper is sometimes called sheet exhaustion. In the present embodiment, the association information management unit 308 transmits a job sheet on which job information of a job printed on an output roll is printed to the image forming apparatus 103, and manages the output roll by outputting the job sheet. Note that the job management unit 302, the job storage unit 303, the job status management unit 305, the association information management unit 308, and the like may be collectively referred to as a management unit.

Example of Hardware Configuration of the Image Forming Apparatus 102

Figure 4:
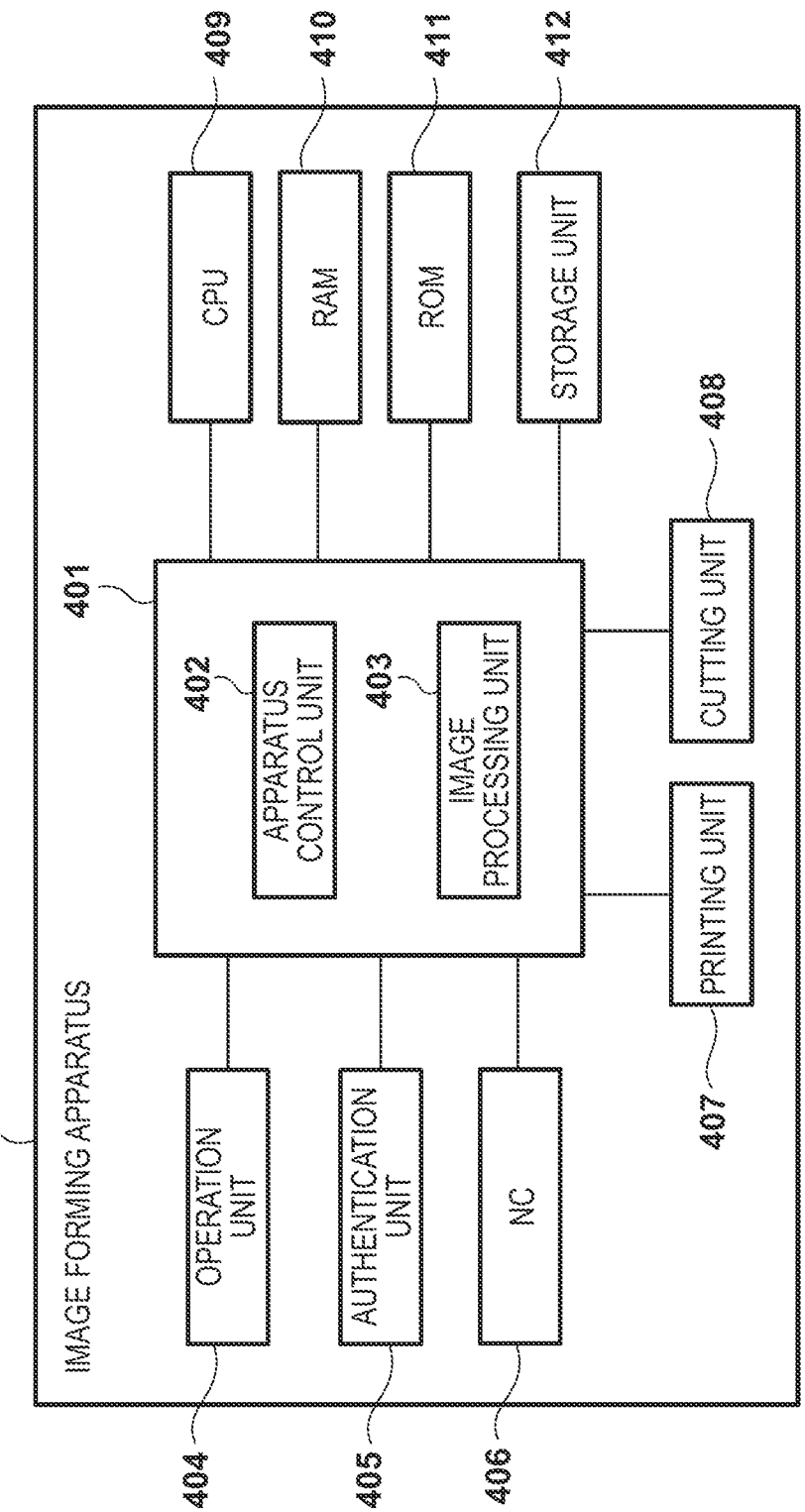
FIG. 4 is a block diagram illustrating a hardware configuration of an image forming apparatus 102 according to an embodiment.

FIG. 4 is a hardware configuration diagram of the image forming apparatus 102. The image forming apparatus 102 includes an operation unit 404, an authentication unit 405, a network controller (NC) 406, a CPU 409, a RAM 410, a ROM 411, a storage unit 412, a printing unit 407, and a cutting unit 408, and these are connected through a control unit 401. The control unit 401 includes an apparatus control unit 402 that controls the entire image forming apparatus 102, and an image processing unit 403 that processes image data. The operation unit 404 is configured by, for example, a software keyboard, a touch panel, or another input device, and enables the input and display of various setting values. For example, an instruction to cut a sheet may be input from the operation unit 404. The CPU 409 executes a program such as a program stored in the ROM 411 or an application loaded into the RAM 410 from the storage unit 412. The RAM 410 is a main memory of the CPU 409 and functions as a work area or the like. The control unit 401 provides a document image (or a character string) stored in the storage unit 412 to the operation unit 404, and executes a process of outputting the document image onto the operation unit 404. Similarly, the control unit 401 provides the document image stored in the storage unit 412 to the printing unit 407, and the printing unit 407 executes processing for outputting the document image in various formats. Note that the document image provided to the printing unit 407 may be, for example, image data generated based on a print job received from the information processing apparatus 101, and does not necessarily include characters, and may refer to, for example, an image including no characters at all, such as a landscape photograph. For example, the printing unit 407 can execute a process of outputting image data relating to a document image to a storage medium. Alternatively, configuration may be taken such that the printing unit 407 is provided with a printing function, and executes a process of outputting a document image onto roll paper. The cutting unit 408 performs a process of cutting a roll paper, which is a print medium of the image forming apparatus 102, in accordance with an operation on the operation unit 404 or the like, and outputting a roll. The image forming apparatus 102 is connected to the network via the NC 406, enabling data transmission and reception. Data obtained via the NC 406 can also be displayed on the operation unit 404. The image forming apparatus 102 forms an image on roll paper (or roll sheet) wound into a rolled shape, and cuts the roll paper according to an operation by an operator.

Example of Software Configuration of the Image Forming Apparatus 102

Figure 5:
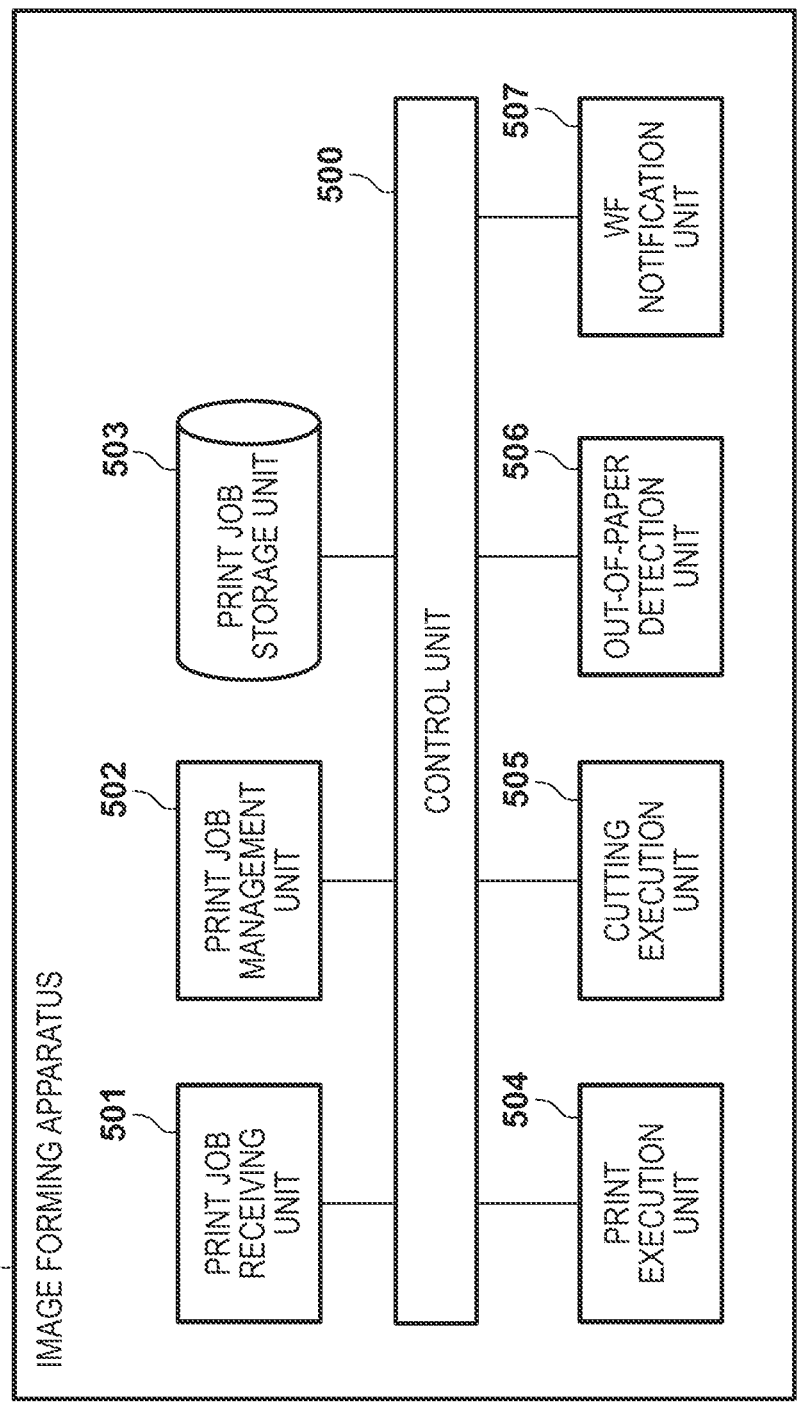
FIG. 5 is a block diagram illustrating a software configuration of the image forming apparatus 102 according to an embodiment.

FIG. 5 is a software configuration diagram of the image forming apparatus 102. The image forming apparatus 102 includes a print job receiving unit 501, a print job management unit 502, a print job storage unit 503, a print execution unit 504, a cutting execution unit 505, an out-of-paper detection unit 506, and a workflow (WF) notification unit 507, and is controlled via the control unit 500. The print job receiving unit 501 receives a print job via the NC 406 or the like, and stores the print job in the print job storage unit 503. The print execution unit 504 executes printing via the printing unit 407 based on information of a print job stored in the print job storage unit 503. The print execution unit 504 may generate a document image from the print job and cause the printing unit 407 to perform printing. The cutting execution unit 505 cuts roll paper, which is the print medium, through the cutting unit 408 based on a user's cutting instruction that was made on the image forming apparatus 102. When the cutting execution unit 505 cuts a sheet, cutting information is notified to the information processing apparatus 101 via the WF notification unit 507. The out-of-paper detection unit 506 detects that the roll paper, which is the print medium, has run out and that printing cannot be continued. When the out-of-paper detection unit 506 detects out-of-paper, out-of-paper information is notified to the information processing apparatus 101 via the WF notification unit 507. The WF notification unit 507 notifies the information processing apparatus 101 of the execution of cutting by the cutting execution unit 505, and notifies the information processing apparatus 101 of out-of-paper information detected by the out-of-paper detection unit 506. The WF notification unit 507 realizes notification to the information processing apparatus 101 via the NC 406. Note that the image forming apparatus 102 may perform cutting at a break between print jobs without an operator's operation. Alternatively, a cutting instruction may be inserted at the end of a print job generated by the information processing apparatus 101. As a result, the roll sheet is cut for each print job, and one print job is printed on one continuous sheet, as long as there is no cutting in accordance with an operator's operation and paper does not run out.

Example of Hardware Configuration of the Image Forming Apparatus 103

Figure 6:
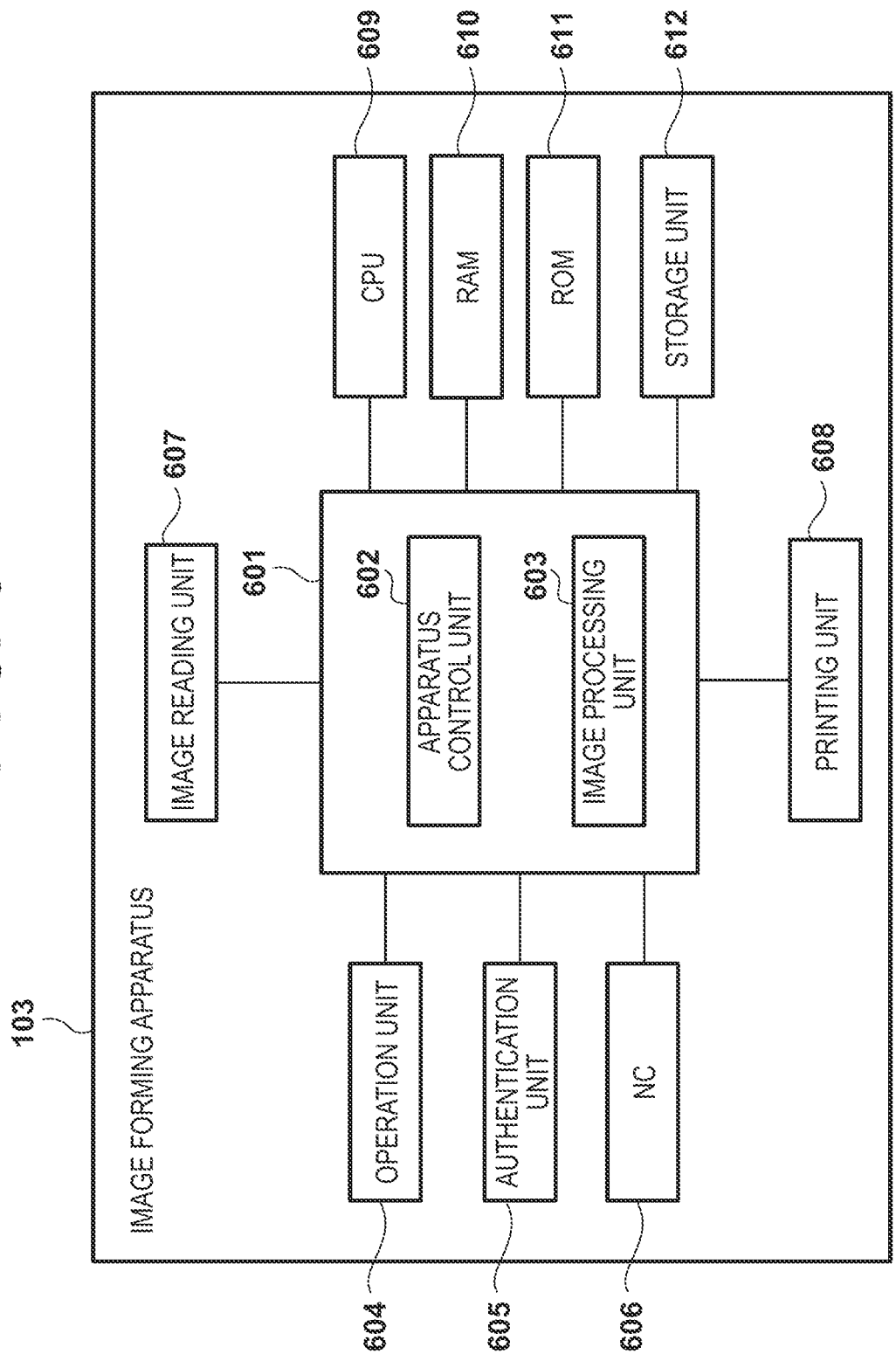
FIG. 6 is a block diagram illustrating a hardware configuration of an image forming apparatus 103 according to an embodiment.

FIG. 6 is a hardware configuration diagram of the image forming apparatus 103. The image forming apparatus 103 includes an operation unit 604, an authentication unit 605, an NC 606, a CPU 609, a RAM 610, a ROM 611, a storage unit 612, an image reading unit 607, and a printing unit 608, and these are connected via a control unit 601. The control unit 601 includes an apparatus control unit 602 that controls the entire image forming apparatus 103, and an image processing unit 603 that processes image data. The operation unit 604 is configured by, for example, a software keyboard, a touch panel, or another input-output device, and enables the input and display of various setting values. The CPU 609 executes a program such as a program stored in the ROM 611 or an application loaded into the RAM 610 from the storage unit 612. The RAM 610 is a main memory of the CPU 609 and functions as a work area or the like. The image reading unit 607 is configured by, for example, a scanner, and can acquire a document image in an image data format by reading a paper document or the like. The control unit 601 provides a document image stored in the storage unit 612 to the operation unit 604, and executes a process of outputting the document image on the operation unit 604. Similarly, the control unit 601 provides the document image stored in the storage unit 612 to the printing unit 608, and the printing unit 608 executes processing for outputting the document image in various formats. For example, the printing unit 608 can execute a process of outputting image data relating to a document image to a storage medium. Alternatively, configuration may be taken such that the printing unit 608 is provided with a printing function, and executes a process of outputting a document image onto an output medium such as a paper medium. The image forming apparatus 103 is connected to the network via the NC 606, enabling data transmission and reception. Data obtained via the NC 606 can also be displayed on the operation unit 604. The image forming apparatus 103 forms an image on a cut sheet that has been cut into a predetermined shape according to a standard, for example.

Example of Job Information Stored in the Job Storage Unit 303

FIG. 7 is an example of job information stored in the job storage unit 303 of the information processing apparatus 101 of the present embodiment. A job ID 700 stores a job ID that uniquely defines a job which is required to produce a product. A job status 701 stores a job status indicating the progress status of a job executed by the image forming apparatus 102. For example, when a job is registered, "Before Sending" is stored as the job status, when the job is transmitted to the image forming apparatus 102, "Sent to printer" is stored as the job status, and when the print is completed, "Printed" is stored as the job status. The job status is updated in accordance with, for example, the progress of the processing of the print job by the information processing apparatus 101 or a job status notification received from the image forming apparatus 102. Association management information 702 stores association management information indicating an output status of a job sheet displaying the association information. In the present embodiment, the association management information is updated in response to reception of, for example, a cut notification, an out-of-paper notification, or a print completion notification. In the present embodiment, the association management information indicates whether association information for associating printed matter and a print job is yet to be output, is being output but is incomplete, or for which output has completed. In the present embodiment, since the association information is output as a job sheet, the output status of the job sheet is stored, but any form of information can be used as long as the association information can be managed. For example, the output roll and the product may be associated by storing a number assigned to the output roll. Product information 703 stores product information that is information for specifying the product described in the order information. The association information management unit 308 realizes association of the product and the output roll by using the product information. For example, by embedding the product information in the job sheet and managing it together with the output roll, the association between the product and the output roll is realized.

Example of Job Information Stored in the Job Storage Unit 303 after Notification Acquisition FIG. 8 illustrates an example of updated job information in which the job information illustrated in FIG. 7 has been updated in accordance with a received notification when the information processing apparatus 101 receives a job status notification, a cut notification, or an out-of-paper notification from the image forming apparatus 102. FIG. 8 is an example of job information stored in the job storage unit 303 of the information processing apparatus 101 of the present embodiment. Similarly to the column 700, a column 800 stores a job ID that uniquely define a job required to produce a product. Similarly to the column 701, a column 801 stores a job status indicating the progress status of the job. Like the column 702, a column 802 stores association management information indicating a flag for whether a job sheet, which is association information, has been output. Similarly to the column 703, a column 803 stores product information that is information for specifying the product described in the order information. A job status 804 indicates "Sent to Printer" which is a job status of a job (job ID=003) that has been transmitted to the image forming apparatus 102 but for which printing has not completed. The job status may be changed in response to a received job status notification, but there is no change from FIG. 7 in this example Association management information 805 indicates association management information of a job having the job ID of 003. The association management information 805 is updated in response to reception of a cut notification or an out-of-paper notification. The association management information 805 differs depending on a printing continuation method on the image forming apparatus 102.

For example, in FIG. 7, a print job whose job ID is 0003 (referred to as a print job 003) has already been transmitted to the image forming apparatus 102, and its job sheet has not yet been output ("Before output" indicates that output is yet to be performed). In contrast, in FIG. 8, there is an update to "Outputting" indicating that the association management information 805 is an output target in response to, for example, an out-of-paper notification from the image forming apparatus 102. "Output done" indicating completion indicates that all job sheets of a print job have been outputted. For example, if there is an out-of-paper notification and a continuation method of the out-of-paper job is "continuation", the job sheet is output with correspondence between a part printed on a previous roll and a part printed on a roll after replacement. In such a case, for example, if a job sheet corresponding to the pre-replacement roll has been outputted, the association management information of the job is changed to "Outputting". Note that "continuation" is a method of printing one print job by dividing it into rolls before and after the paper runs out. There is also "reprint", in which case there is a restart from the start of the print job with respect to the roll after replacement. Since a job sheet is also a print job transmitted to the image forming apparatus 103, the association management information may be updated when a notification of the state information indicating the completion of the print job for the job sheet is received from the image forming apparatus 103, in addition to a cut notification or an out-of-paper notification from the image forming apparatus 102. This is, of course, an example, and other methods that can indicate the state of the job sheet may be employed.

Flow at the Time of Order Registration in the Information Processing Apparatus 101

Figure 9:
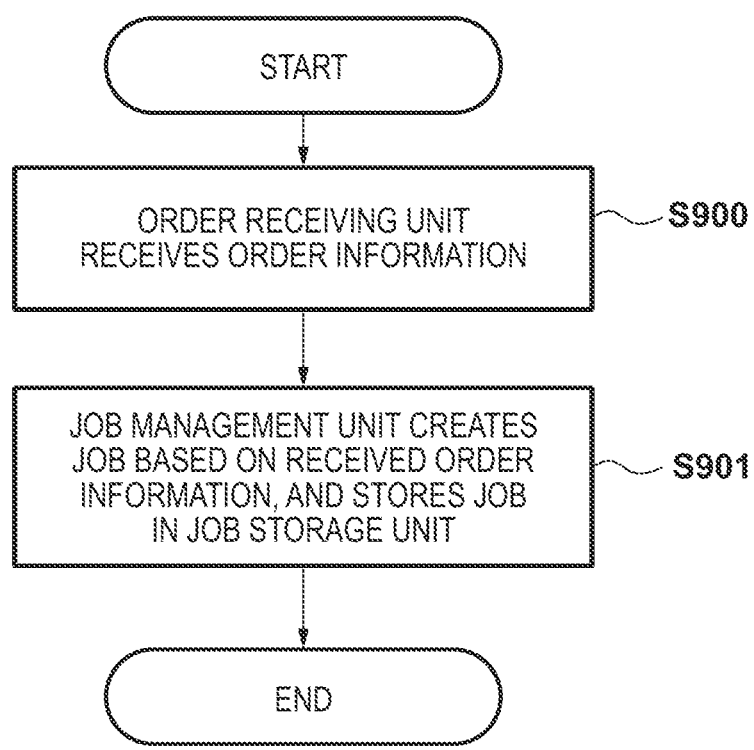
FIG. 9 is a flow for a time of registering an order in the information processing apparatus 101 according to an embodiment.

FIG. 9 is a flow chart illustrating a flow from reception of an order to creation and storage of a print job in the information processing apparatus 101 of the present embodiment. The programs related to the respective flows are stored in the ROM 202 of the information processing apparatus 101, are read out to the RAM 201, and are executed by the CPU 200.

In step S900, the order receiving unit 301 receives order information from a higher level server such as an MIS. The received order information is passed to the job management unit 302.

In step S901, the job management unit 302 analyzes the order information received from the order receiving unit 301 line by line to create a print job. The job management unit 302 stores the created print job in the job storage unit 303. At this time, the job ID of the created print job and the initial value of each column are newly registered in job information that is illustrated in FIG. 7 and the like.

<Processing Flow when Executing Print Job in Printing System>

Figure 10:
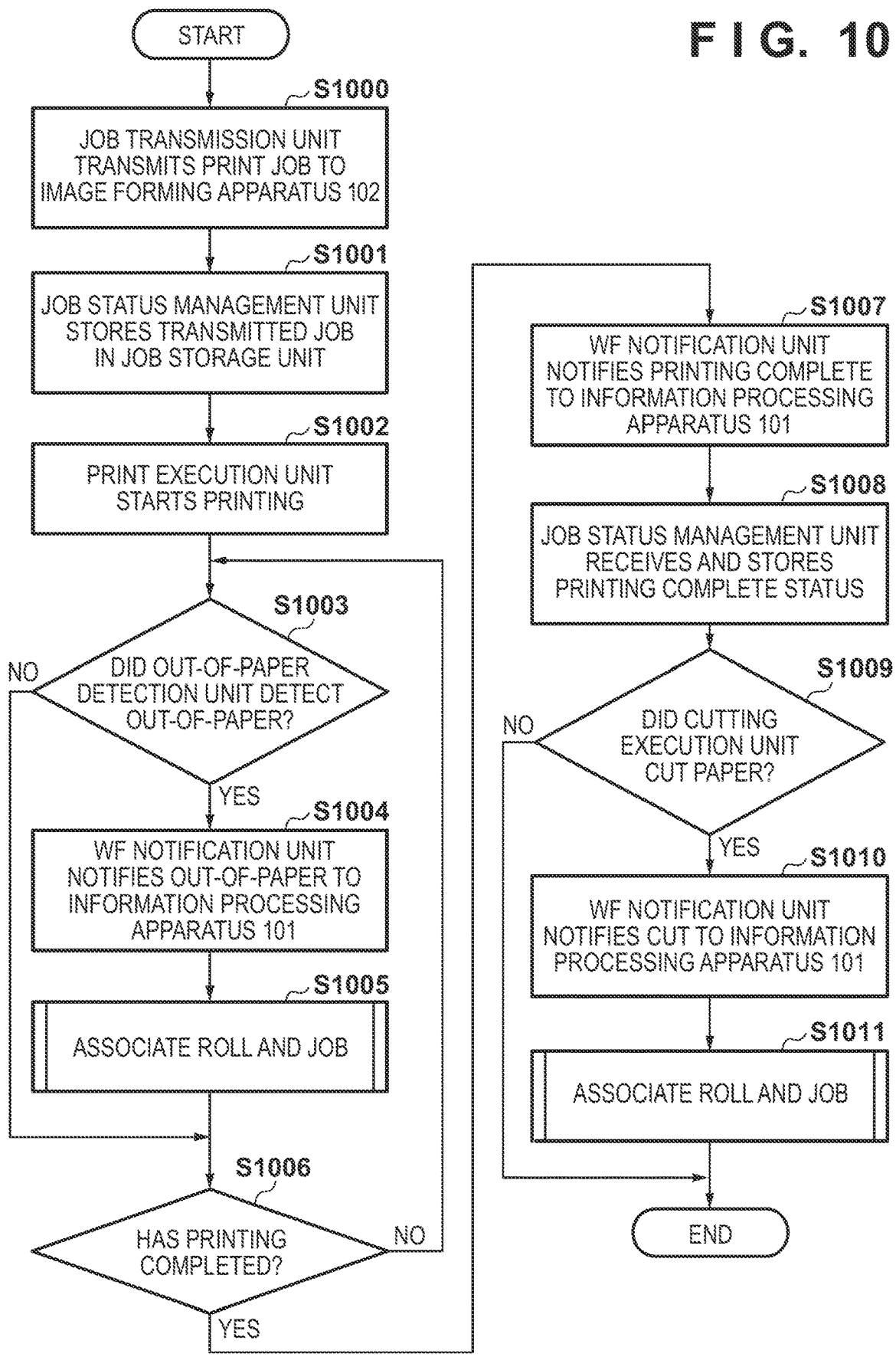
FIG. 10 is a flow for a time of printing in the printing system according to an embodiment.

FIG. 10 is a flow chart illustrating a flow of a print control method until the information processing apparatus 101 transmits a print job to the image forming apparatus 102 and the image forming apparatus 102 completes the print job in the printing system of the present embodiment. The programs related to the respective flows relating to the information processing apparatus 101 are stored in the ROM 202 of the information processing apparatus 101, are read out to the RAM 201, and are executed by the CPU 200. Operation relating to each flow of the image forming apparatus 102 is controlled and executed by the control unit 401. Because FIG. 10 describes processing by the information processing apparatus 101 and processing by the image forming apparatus 102 in one flow, functional modules illustrated in FIG. 3 or FIG. 5, which are the performers of respective steps, are indicated.

In step S1000, the job transmission unit 304 transmits a print job to the image forming apparatus 102. The transmitted print job is received by the print job receiving unit 501 of the image forming apparatus 102, and is stored in the print job storage unit 503 by the print job management unit 502.

In step S1001, the job status management unit 305 changes the status of the print job transmitted by the job transmission unit 304 to a transmitted status, and the job status changed via the job management unit 302 is reflected to the job information stored in the job storage unit 303.

In step S1002, the print execution unit 504 of the image forming apparatus 102 executes the print job stored in the print job storage unit 503, and starts printing. Note that, in this description, it is assumed that one print job is transmitted to the image forming apparatus 102 at a time, and the print job is executed. Therefore, in the information processing apparatus 101, a print job transmitted to the image forming apparatus 102 can be specified by its job status. In a case of scheduling a plurality of print jobs in a queue of the image forming apparatus 102, it is necessary to specify a target print job using, for example, a job ID.

In step S1003, it is determined whether the out-of-paper detection unit 506 of the image forming apparatus 102 has detected being out-of-paper while printing is being executed. When out-of-paper is detected, the processing transitions to step S1004. When out-of-paper is not detected, the processing transitions to step S1006.

In step S1004, the WF notification unit 507 of the image forming apparatus 102 transmits an out-of-paper notification to the information processing apparatus 101. As a method for the WF notification unit 507 to notify the information processing apparatus 101, notification may be by Job Messaging Format (hereinafter referred to as "JMF"), and notification may be by other communication means, and the notification means is not limited.

Figure 11:
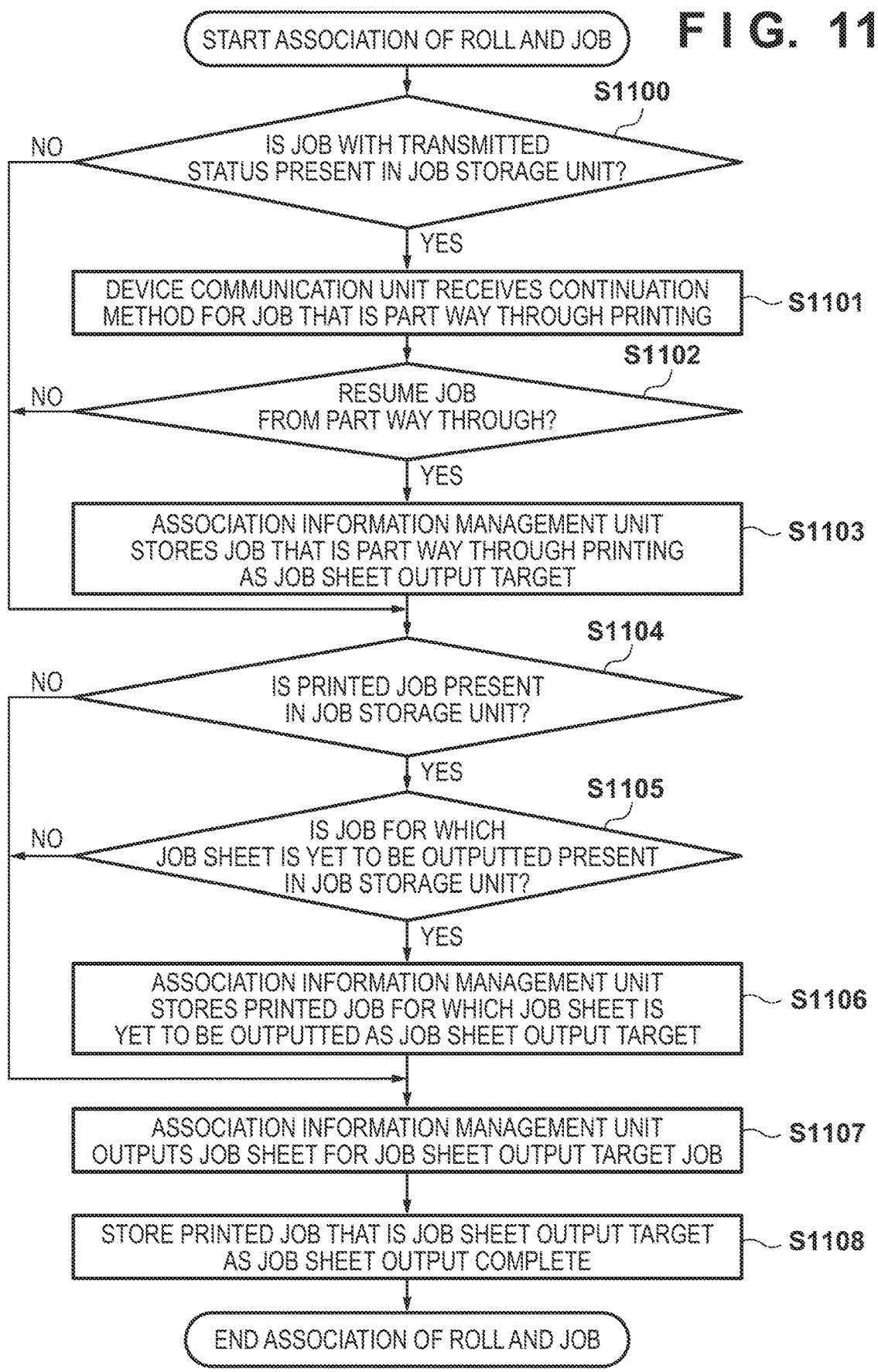
FIG. 11 is a flow for a time of outputting a job sheet in the printing system according to an embodiment.

In step S1005, the information processing apparatus 101 performs processing for associating a roll and a job in sub-steps illustrated in FIG. 11.

In step S1006, the print execution unit 504 of the image forming apparatus 102 determines whether execution of the print job has completed. If it is determined that the print job has not completed, the process transitions to step S1003. If it is determined that the print job has completed, the process transitions to step S1007.

In step S1007, the WF notification unit 507 of the image forming apparatus 102 notifies the completion of printing to the information processing apparatus 101. A method by which the WF notification unit 507 notifies the information processing apparatus 101 may be notification by JMF or notification by other communication means, and the notification means is not limited.

In step S1008, the job status of the print job is changed to the printing complete status based on the print completion notification received by the job status management unit 305 of the information processing apparatus 101, and the changed job status is reflected to the job information stored in the job storage unit 303 via the job management unit 302.

In step S1009, the cutting execution unit 505 of the image forming apparatus 102 determines whether the output roll has been cut. For example, an operator of a roll paper printer performs cutting after printing a job in order to replace the paper. When the cutting execution unit 505 executes the cut, the process transitions to step S1010. When the cutting execution unit 505 does not execute cutting, the flow of the print job execution is terminated.

In step S1010, the WF notification unit 507 of the image forming apparatus 102 transmits a cut notification to the information processing apparatus 101. A method by which the WF notification unit 507 notifies the information processing apparatus 101 may be notification by JMF or notification by other communication means, and the notification means is not limited.

In step S1011, the information processing apparatus 101 performs processing for associating a roll and a job in sub-steps illustrated in FIG. 11.

To summarize the above, the information processing apparatus 101 executes step S1000, step S1001, step S1005, step S1008, and step S1011 in order, and the image forming apparatus 102 executes step S1002, step S1003, step S1004, step S1006, step S1007, step S1009, and step S1010 in order. However, the processing by the information processing apparatus 101 and the processing by the image forming apparatus 102 are synchronized as illustrated in FIG. 11. Immediately before step S1005 and step S1011, the information processing apparatus 101 determines reception of a cut notification and an out-of-paper notification from the image forming apparatus 102, respectively, and executes step S1005 and step S1011 on the condition that a cut notification and an out-of-paper notification are received.

<Processing Flow at Time of Association of Output Roll and Job in Printing System>

FIG. 11 is a flowchart illustrating the flow of S1005 and S1011 in which the information processing apparatus 101 receives an out-of-paper notification or a cut notification from the image forming apparatus 102, and performs association of an output roll and a print job in the printing system according to the present embodiment. The programs related to the respective flows relating to the information processing apparatus 101 are stored in the ROM 202 of the information processing apparatus 101, are read out to the RAM 201, and are executed by the CPU 200.

In step S1100, the association information management unit 308 determines whether or not a job with a transmitted status exists among the jobs stored in the job storage unit 303. When the stored job information is the job information in FIG. 7, the job status of the job whose Job ID is 003 is "Sent to Printer", and thus the job information corresponds to a job with a transmitted status. If it is determined that there is a job with a transmitted status, the processing transitions to step S1101. If it is determined that there is no job with a transmitted status, the processing transitions to step S1104.

In step S1101, the association information management unit 308 receives from the image forming apparatus 102 a continuation method for a job in the process of being printed. In the present embodiment, consideration is given in the continuation method as to whether the job in the middle of printing is resumed with a new roll (also referred to as continuation) or the job in the middle of printing is redone from the start with a new roll (also referred to as reprinting), and this is determined by the operator of the roll paper printer performing a setting of the next print job. The image forming apparatus 102 transmits the setting of the next print job made by the operator to the association information management unit 308 of the information processing apparatus 101. It should be noted that the setting information of the next print job may be notified by creating a Job Definition Format (hereinafter referred to as "JDF") file, or may be notified by another means.

In step S1102, the information processing apparatus 101 tests the continuation method received in step S1101. When it is determined that "continuation", that is, a job in the middle of printing is to be resumed with a new roll from the interrupted part, the process transitions to step S1103. On the other hand, when it is determined that "reprint" is performed, that is, jobs in the middle of printing are redone from the start with a new roll, the process transitions to step S1104.

In step S1103, the association information management unit 308 stores the job being printed as a job sheet output target. When the stored job information is that in FIG. 7, a print job (job status is "Sent to Printer") in which a job whose job ID is 003 is just transmitted to the image forming apparatus 102. Therefore, the job is stored as a job sheet output target. This storage is realized, for example, by rewriting the association management information into "Output" as illustrated in FIG. 8.

In step S1104, the association information management unit 308 determines whether or not a job with a printing complete status exists among the jobs stored in the job storage unit 303. When the stored job information is that in FIG. 7, since the job status of the job whose Job ID is 001 and the job whose Job ID is 002 are "Printed", these jobs corresponds to jobs whose printing is completed. If it is determined that there is a job with a printing complete status, the processing transitions to step S1105. If it is determined that there is no job with a printing complete status, the processing transitions to step S1107.

In step S1105, the association information management unit 308 determines whether or not a job having no association information is present among print completion jobs. When the stored job information is that in FIG. 7, out of jobs where the Job ID is 001 and the Job ID is 002 which are print completion jobs, for the job whose Job ID is 002, a job sheet is yet to be outputted, and therefore, the job is determined to be a job in which there is no association information. Further, since the output of all job sheets has not completed for the jobs that are job sheet output targets, it is determined in this step that these jobs do not have association information. If it is determined that there is a job for which printing is complete and that has no association information, the processing transitions to step S1106. If it is determined that there is no job for which printing is complete and that has no association information, the processing transitions to step S1107.

In step S1106, the association information management unit 308 stores job information (e.g., job IDs) of jobs whose job statuses are that printing is complete and whose association information does not exist, as job sheet output targets. When the stored job information is that in FIG. 7, the job whose Job ID is 002 is stored as a job sheet output target. As a result, as illustrated in FIG. 8, the association management information is changed to "Output", in other words an output target.

In step S1107, the association information management unit 308 generates a job sheet of a job stored as a job sheet output target, and transmits the job sheet to the image forming apparatus 103 to output the job sheet. In the job sheet, information for specifying a job and information for specifying a product, such as order information, product information, job ID, and the like, are included as association information (alternatively, association information may be referred to as management information). There is a possibility that there are a plurality of jobs stored as job sheet output targets, and in this case, job sheets are output in the order in which print jobs are executed, for example, from a job having an older job ID first. In this way, the order of the outputted print job and the job sheet can be associated with each other. On the other hand, when a job stored as a job sheet output target does not exist, a job sheet is not output.

In step S1108, after the output of the job sheet, the association management information that indicates the output status of the job sheet and is stored in the job storage unit 303 is updated. Here, for example, for a print job whose job status is that it is already printed and whose association management information is a job sheet output target, the association management information is rewritten to job sheet output complete ("Output done"). Therefore, jobs set as output targets in step S1103 are not updated. The association management information of such a job is updated after the job has been printed and the last job sheet is output. As a result of the update, the job information stored in the state of FIG. 7 transitions to the state of FIG. 8. At this time, since printing has not been completed for the job whose Job ID is 003 which was a job that was partway through printing, the job sheet output status is stored as a state where is was set to an output target but output is not yet complete. This condition is handled in the same manner as a job having no association information, and is determined in step S1105 to be a job having no association information. Through the above processing, it is possible to manage the output roll in response to roll switching attributable to the device such as being out-of-paper or a cutting instruction on the device side.

In the above description, it is assumed that continuation method information indicating the continuation method of the job is designated by the image forming apparatus 102, and the information processing apparatus 101 acquires the continuation method information from the image forming apparatus 102, but the continuation method information may be set in the information processing apparatus 101. This setting may be performed for each print job, or there may be a setting common to print jobs. In this case, in step S1101, reference may be made to the setting of the continuation method of the information processing apparatus 101. The cutting instruction for the roll sheet between the print jobs is, for example, embedded in a print job, and a cut notification does not need to be issued for the cut in this case.

As described above, according to the present embodiment, even in the case where the printed matter for one print job is divided into a plurality of pieces due to cutting, sheet exhaustion, or the like, a job sheet is printed for each of the divided portions. For this reason, correspondence between a job sheet capable of specifying a print job and printed matter which is the product of the print job becomes clear, and there is no complexity in terms of operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-208368, filed Nov. 5, 2018, which is hereby incorporated by reference herein in its entirety.

What is claimed is:

1. An information processing apparatus, comprising:
   a generator configured to generate a print job based on inputted order information;
   a transmitter configured to transmit the print job to an image forming apparatus for forming an image on a roll sheet; and
   a manager configured to output association information associating the print job with printed matter of the roll sheet in accordance with the print job,
   wherein, when printed matter for one print job is divided into a plurality of pieces, the manager outputs the association information for each piece of the divided printed matter, and
   wherein the association information includes the order information as information for specifying each print job and the printed matter.

2. The information processing apparatus according to claim 1, wherein
   in a case where printed matter for one print job is divided into a plurality of pieces in response to a cut notification notifying a cut of a roll sheet in response to a cutting operation by an operator or a sheet exhaustion notification in response to sheet exhaustion of the roll sheet received from the image forming apparatus, the manager outputs the association information for each piece of the divided printed matter.

3. The information processing apparatus according to claim 2, wherein
   when the manager receives the cut notification or the sheet exhaustion notification, if a continuation method for a case of cutting or sheet exhaustion of the roll sheet part way through the print job indicates continuation of the print job, the manager treats one print job as having been divided into a plurality of pieces of printed matter, and outputs the association information for each piece of divided printed matter.

4. The information processing apparatus according to claim 3, wherein
   the continuation method is designated by the image forming apparatus and transmitted to the information processing apparatus.

5. The information processing apparatus according to claim 1, wherein
   the association information is transmitted to a second image forming apparatus and printed by the second image forming apparatus.

6. The information processing apparatus according to claim 1, wherein
   the association information is output in the same order as the corresponding print job or portion of the print job.

7. A printing system, comprising:
   an information processing apparatus;
   an image forming apparatus; and
   a second image forming apparatus,
   wherein the information processing apparatus comprises:
     a generator configured to generate a print job based on inputted order information;
     a transmitter configured to transmit the print job to the image forming apparatus to form an image on a roll sheet; and
     a manager configured to output association information associating the print job with printed matter of the roll sheet in accordance with the print job,
     wherein, when printed matter for one print job is divided into a plurality of pieces, the manager outputs the association information for each piece of the divided printed matter, and wherein the association information includes the order information as information for specifying each print job and the printed matter.

8. A print control method, comprising:

generating a print job based on inputted order information;

transmitting the print job to an image forming apparatus for forming an image on a roll sheet; and outputting association information associating the print job with printed matter of the roll sheet in accordance with the print job, wherein, when printed matter for one print job is divided into a plurality of pieces, the association information is outputted for each piece of the divided printed matter, and wherein the association information includes the order information as information for specifying each print job and the printed matter.

\* \* \* \* \*